(No Model.)

A. B. MOUCK.
HARVESTER.

No. 375,376. Patented Dec. 27, 1887.

Witnesses

Inventor
Andrew B. Mouck.
By A. C. Paul
Atty.

UNITED STATES PATENT OFFICE.

ANDREW B. MOUCK, OF FARGO, DAKOTA TERRITORY.

HARVESTER.

SPECIFICATION forming part of Letters Patent No. 375,376, dated December 27, 1887.

Application filed December 19, 1885. Serial No. 186,112. (No model.)

*To all whom it may concern:*

Be it known that I, ANDREW B. MOUCK, of Fargo, in the county of Cass and Territory of Dakota, have invented certain Improvements in Harvesters, of which the following is a specification.

My invention relates to that class of harvesters in which endless belts or aprons are used to deliver the cut grain to binding mechanism; and the invention consists, generally, in the construction and combination, hereinafter described, and particularly pointed out in the claims.

Figure 1:
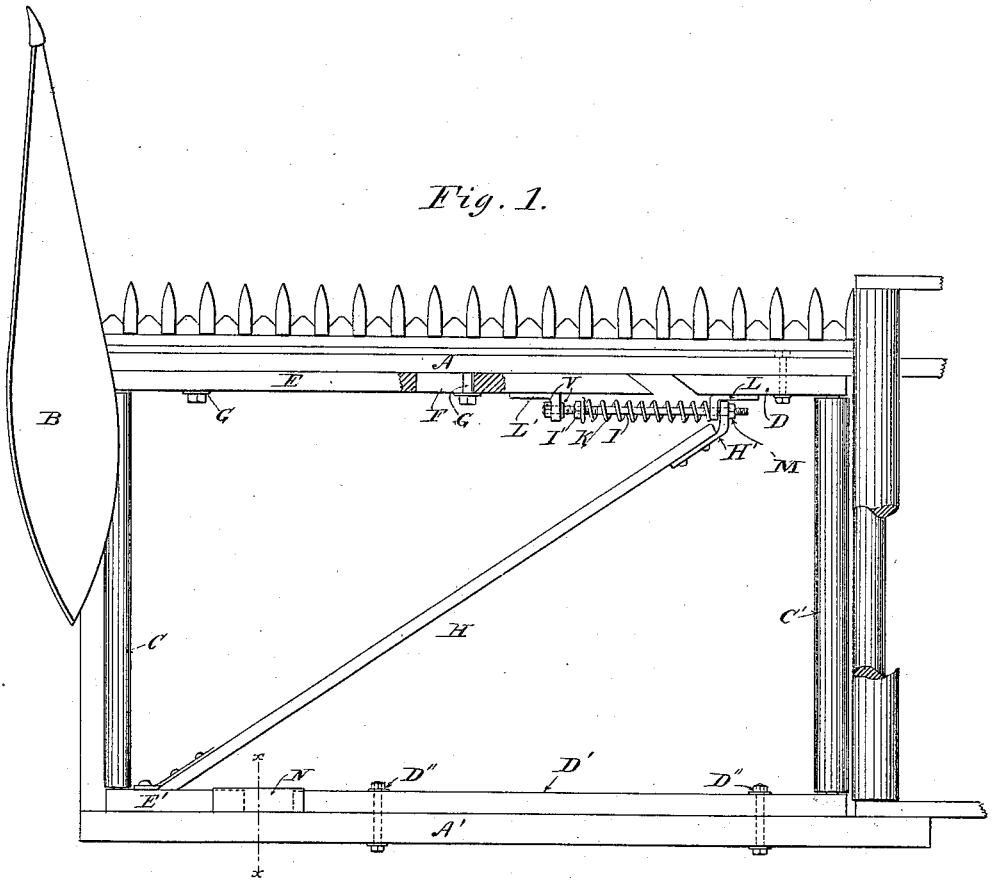
Figure 2:
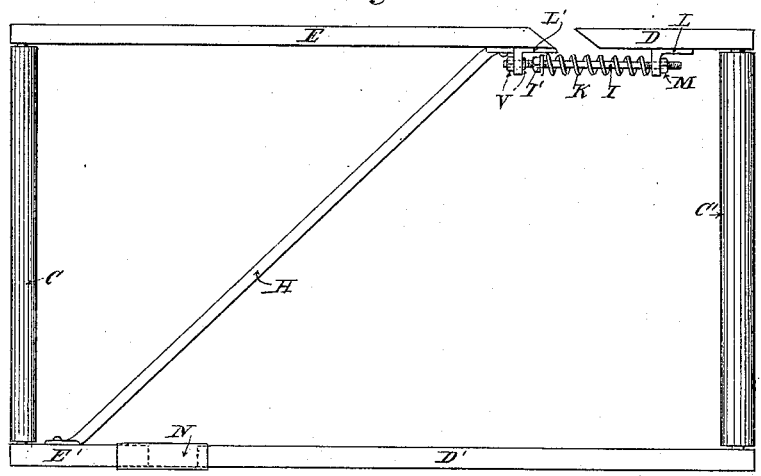
Figure 3:
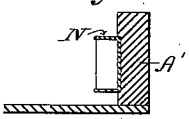

In the accompanying drawings, forming part of this specification, Figure 1 is a plan view of a harvester-platform with the delivery-apron removed. Fig. 2 is a plan of the apron-frame, with a modified arrangement of brace. Fig. 3 is a detail-section on lines $x\ x$ of Fig. 1.

A represents the front platform-sill. To this the cutting apparatus is attached.

A' is the rear platform-sill.

B is the grain-divider.

The apron-frame consists of two parts, one of which is rigidly attached to the platform and carries the apron-driving roll. The other is movable and carries the roller at the grain end of the platform, around which the apron is drawn. The rigid portion of the frame consists of a preferably short bar, D, bolted or otherwise firmly secured to the front sill, A, and a longer bar, D', secured, preferably by bolts D'', to the back sill, A'. In these bars the apron-driving roll C' is journaled. The movable part of the frame consists, preferably, of the long bar E and the short bar E', in the ends of which the roll C is journaled. The bar E is secured to the front sill, so as to be free to slide lengthwise thereof, preferably by bolts G, that pass through the slots F in the bar, and the bar E' is secured to the rear sill, either by similar bolts and slots or by plates N, that are fastened to the sill and project above and below the bar, as shown in Fig. 3. It will be seen that with this construction the movable part of the frame is free to move lengthwise of the platform to a limited extent. I provide means for moving the movable part of the frame away from the fixed part to hold the apron taut, while preserving the parallelism of the rolls, as follows:

L' is a lug secured to the inner side of the movable bar E. A similar lug, L, is secured to the fixed bar D. A rod, I, is secured to the lug L', preferably by the nuts V, and passes freely through the lug L. A spring, K, surrounds the rod I, and bears against the lug L and against the lug L' or a tightening-nut, I', on the rod I.

H is a diagonal brace that is firmly secured to the bar E' and extends across the platform, and has its opposite end secured to the rod I by a strap, H', which has a hole in it through which the rod I passes. The end of the rod is screw-threaded and provided with a nut, M. By this means the brace is firmly secured to the rod. By adjusting the nut M the distance that the movable part of the frame can move under the pressure of the spring may be regulated.

In Fig. 2 I have shown the brace secured directly to the bar E, and in some instances I consider this arrangement preferable. In either instance the movable bars are firmly secured, so that they are always parallel, and the movable roll is thus kept parallel with the fixed roll. With this construction the frame must move as a whole, and but a single spring is needed to control it. This spring may be located at either side of the platform, and whatever force is exerted to move the frame each end of the roller is moved an equal distance and the apron is evenly stretched, and an even movement thereof is insured.

If desired, the spring may be arranged at the other end of the brace.

I am aware that an apron for harvesters, with separating-rollers for the same located at the ends of the apron-frame, combined with an automatic yielding mechanism to vary the distance between said rollers, all placed between said rollers and covered and concealed by the said apron, is not new, and hence I do not claim the same.

I claim as my invention—

1. The combination, in an apron-frame for harvesters, of the short bar D and the longer bar, D', rigidly secured to the platform, the apron-roll C', journaled in said bars, the movable short bar E' and movable long bar E, the diagonal brace H, connecting said bars, the roll C, journaled in said bars, and the spring K, arranged between said fixed bar D and said movable bar E to move said movable bars away from said fixed bars, substantially as described.

2. The combination, with the fixed bars D D' and roll C', of the movable bars E E', the roll C, journaled therein, the diagonal brace H, lugs L L', rod I, having nuts I' and M, and the spring K, surrounding said rod I and bearing upon a lug fixed upon said bar D, whereby said movable bars are forced away from said fixed bars, as described, and for the purpose set forth.

In testimony whereof I have hereunto set my hand this 2d day of December, 1885.

ANDREW B. MOUCK.

In presence of—
FRANK H. IRONS,
C. M. MORTON.